Oct. 4, 1955

G. P. PEED, JR 2,719,684

AIRCRAFT CONTROL

Filed Sept. 4, 1951

2 Sheets-Sheet 1

INVENTOR.
GARLAND P. PEED JR.
BY

*William P. Lane*

ATTORNEY

Oct. 4, 1955

G. P. PEED, JR 2,719,684

AIRCRAFT CONTROL

Filed Sept. 4, 1951

2 Sheets-Sheet 2

INVENTOR.
GARLAND P. PEED JR.
BY
*William R. Lane*
ATTORNEY 2,719,684
Patented Oct. 4, 1955

2,719,684

AIRCRAFT CONTROL

Garland P. Peed, Jr., Pacific Palisades, Calif., assignor to North American Aviation, Inc.

Application September 4, 1951, Serial No. 244,970

8 Claims. (Cl. 244—83)

This invention pertains to a control system for an aircraft.

The invention particularly pertains to a trimming arrangement for an aircraft provided with power boost controls and artificial pilot feel.

It is an object of this invention to provide an arrangement for trimming the airplane in the event of aerodynamic unbalance.

It is a further object of this invention to provide an arrangement for simultaneously trimming an airplane and relieving excessive pilot feel.

It is yet another object of this invention to provide a device for normalizing pilot feel and simultaneously and completely trimming out the aircraft to overcome any aerodynamic unbalance.

It is still another object of this invention to provide an arrangement whereby, upon failure of the power boost system, the aircraft automatically becomes controllable by the trim arrangement.

Figure 1:
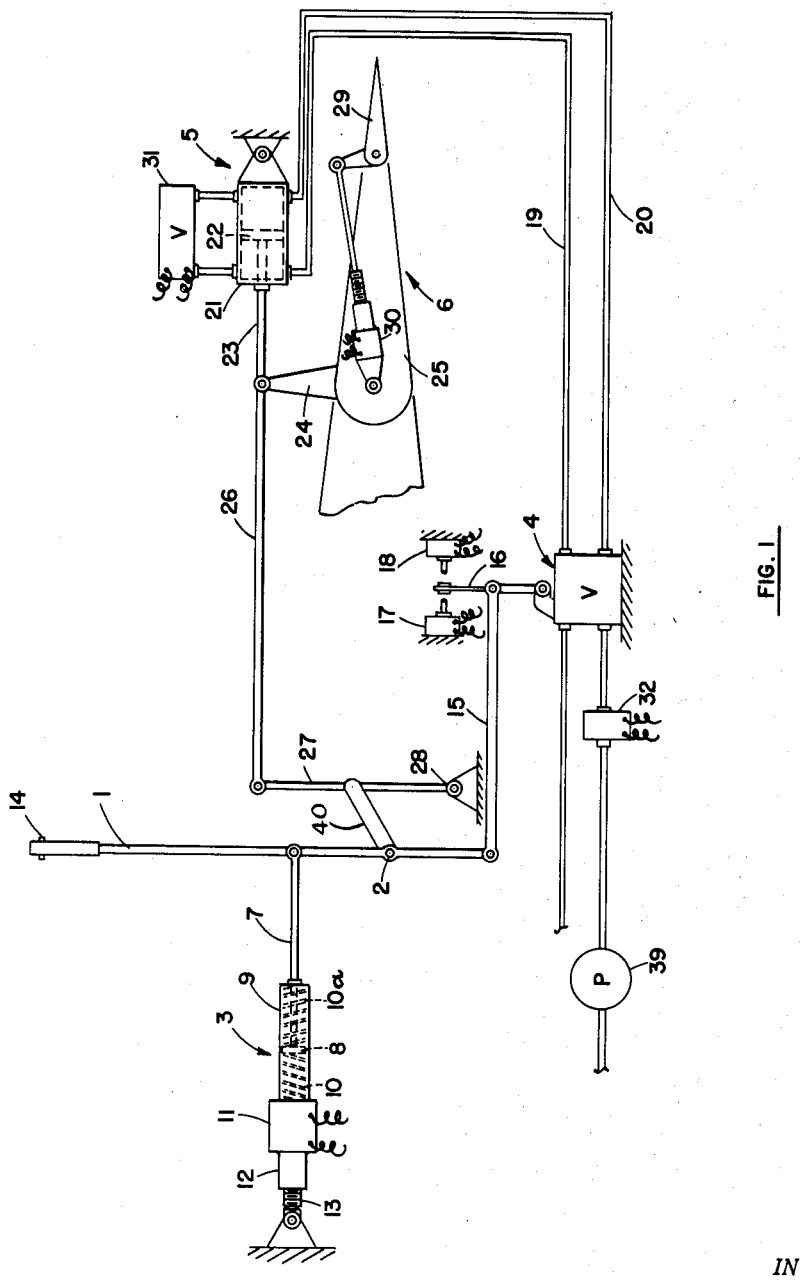
Figure 2:
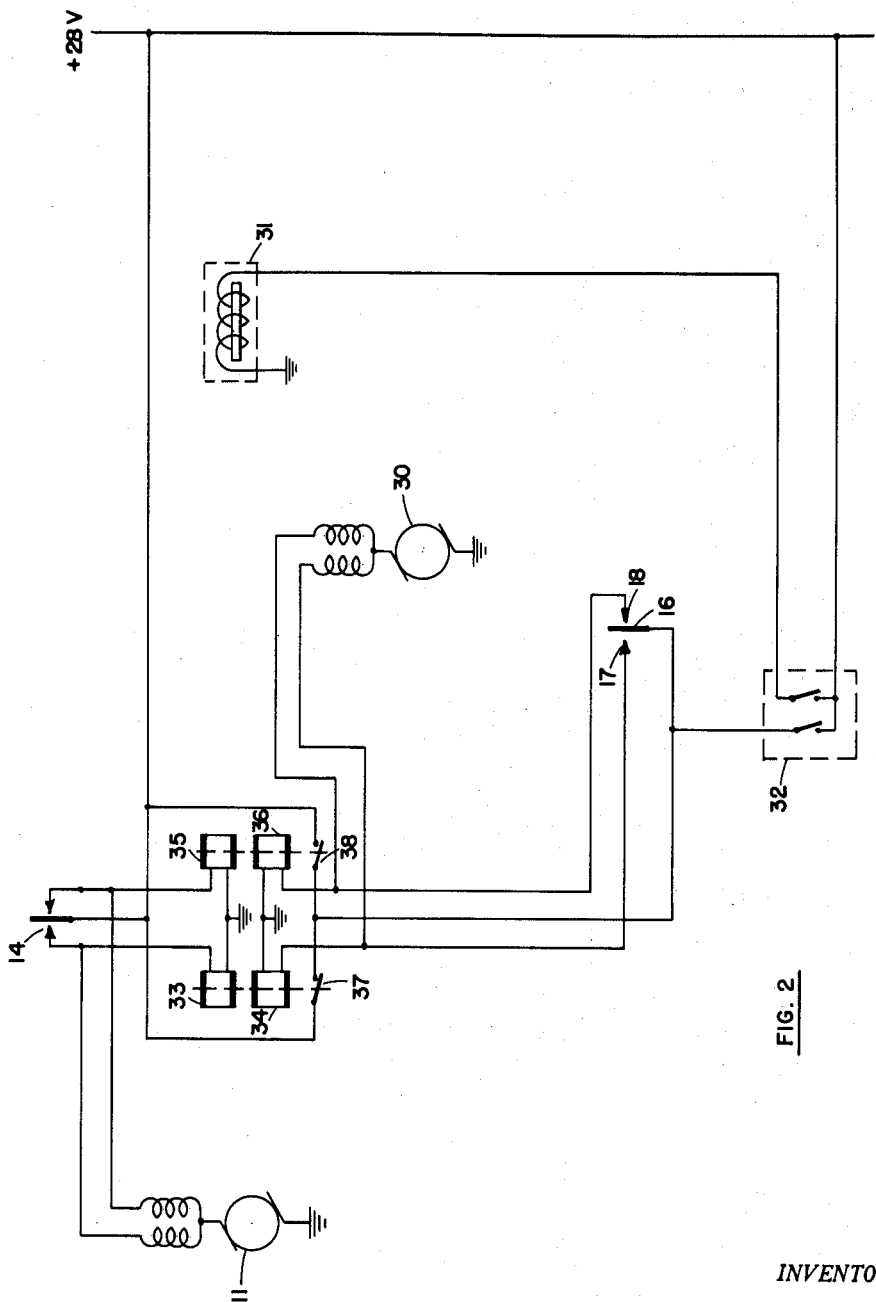

Other objects of invention will become apparent from the following description taken in connection with the accompanying drawings, in which Fig. 1 is a diagrammatic layout of applicant's invention as applied to an airplane, and Fig. 2 is a wiring diagram for the arrangement.

Referring to the drawings, there is provided a pilot control stick 1 pivotally connected to fixed structure of the airplane at 28 through torque shaft 40 and lever 27 and provided with an artificial feel arrangement referred to generally as 3. Stick 1 and lever 27 are arranged in parallel and interconnected through torque member 40. Stick 1 is thus supported by lever 27 pivoted at 28. Stick 1 and lever 27 are each fixed to the respective ends of torque shaft 40. Movement of stick 1 by the pilot results in a pivoting action about point 2 as a result of flexure of member 40. Rotation of stick 1 about point 2 moves rod 15 to actuate valve 4. As hydraulic fluid is supplied to boost cylinder 21, member 26 is moved, repositioning lever 27. This follow-up action restores torque member 40 to a neutral condition with stick 1 and lever 27 again in parallel relationship. Accordingly there is shown operatively connected to the control stick, a servo valve referred to generally as 4 for controlling a power boost arrangement referred to generally as 5. The power boost arrangement actuates the control surfaces referred to generally as 6.

Referring more particularly to the drawings, control stick 1 is connected to the artificial feel means 3 by a rod 7 provided with a piston 8 received in cylinder 9 and having opposed springs 10 and 10a on either side of the piston. Operatively connected to the cylinder casing 9 is a motor 11 having a projecting portion 12 screw-threaded on bolt 13, suitably anchored to the aircraft. Motor 11 is energized by a double throw trim switch 14 for causing the motor 11 and casing portions 9 and 12 integral therein to rotate in either direction with respect to screw bolt 13 and, accordingly, move longitudinally with respect to piston 8 for adjusting the tension on springs 10 and 10a to, in effect, normalize pilot feel.

Control stick 1 is also connected to servo control valve 4 by means of rod 15 which in turn has operatively connected thereto a switch element 16 adapted to contact switch elements 17 and 18 for a purpose to be hereinafter more fully described.

Servo control valve 4 is operatively connected by conduits 19 and 20 to opposite ends of the power boost cylinder 21 provided with a piston 22 adapted to be actuated by hydraulic pressure on one or the other sides thereof. Connected to piston 22 is a control rod 23 and an arm 24 operatively connected to control surface 25 comprising an aileron, flap or other control surface. Also connected to arm 24 is a mechanical followup element 26 operatively connected to the control rod by arm 27 pivotally connected to the aircraft at 28. Aileron 25 has pivotally connected thereto a trim tab 29 operated by an electrical actuator 30.

The power boost arrangement is provided with a by-pass valve 31 controlled by pressure switch 32 which operates upon failure of pressure in the hydraulic line to bypass fluid around the power boost 5. Power is supplied to the hydraulic system by means of a pump 39. As shown in Fig. 2, switch 32 is normally open. Switch 32 is adapted to close upon pressure failure to thereby close the circuit to solenoid-operated valve 31, and move that valve to open position. When switch 32 is closed, power is supplied directly to switch 16 as shown in Fig. 2 of the drawing to obviate any necessity for the pilot closing switch 14 in order to operate trim tab 29 directly by contact of 16 with either 17 or 18.

Operatively connected to trim switch 14 and switching elements 16, 17, and 18, and more particularly shown diagrammatically in the wiring diagram of Fig. 2, are pairs of holding relays 33—34 and 35—36. The pairs of relays 33—34 and 35—36 are each provided with a common armature so that the coils of either of the relays will operate switches 37 and 38 respectively. Electrical energy is supplied to the system from the source indicated in Fig. 2 at 28V. A line is shown leading to switch 32, and from 32 to 16 to supply electrical energy to that line when switch 32 is closed.

In the normal operation of the aircraft, the pilot through control stick 1, operates servo valve 4 in one or the other directions to provide hydraulic fluid to power boost 5 for actuating control surface 25 either upwardly or downwardly. The mechanical followup arrangement 26, being connected back to the control stick, also permits manual operation, to a certain degree, of the control surface 25.

In the event the airplane is subjected to an unbalanced condition such as a change in the forces on the aircraft or as a result of dropping one or more auxiliary fuel tanks, bombs, rockets, or the like, the pilot may desire to retrim the aircraft and also to normalize the artificial feel. To accomplish this result, the circuit for controlling actuator 30 is conditioned for actuation in one or the other direction by a slight movement of the control stick which in turn moves contact element 16 into engagement with either element 17 or 18, depending upon the direction of movement of the stick. The closing of one or the other of these switch elements conditions a circuit leading to either of the pairs of relays 33—34 or 35—36 so that the circuit may be completed by closing switch 14. The resulting energization of either of the pairs of relays 33—34 or 35—36 closes either switch 37 or 38 to complete one or the other of these circuits to energize trim tab actuator in the preselected direction to trim out the aircraft. Either of switches 37 or 38 is held in contact until servo valve 4 is balanced and switch element 16 moves out of contact with either element 17 or 18. If switch 14 is open, the circuit is accordingly broken and the relays are deenergized.

When switch 14 is closed to trim out the aircraft, motor 11 being also connected to these switches is energized to rotate casing 9 to relieve the force on springs 10 or 10a and accordingly normalize the artificial feel.

Switch 14 needs to be actuated only momentarily by the pilot since motor 11 is required to alleviate only relativelyl light forces and therefore is quick-acting. Motor 30, however, is required to overcome relatively heavy forces and is connected to somewhat slow-moving gearing. Accordingly, even though switch 14 is opened, relays 33—34 or 35—36 maintain either switch 37 or 38 in contact until the aircraft is trimmed, whereupon servo valve 4 is balanced and switch element 16 is accordingly moved out of contact with either element 17 or 18. This breaks the circuit to the relays which are de-energized, if switch 14 is open, and results in opening of whichever switch 37 or 38 is closed.

In the event of hydraulic failure, pressure-sensitive switch 32 operates solenoid valve 31, as hereinbefore described, to eliminate any hydraulic pressure on piston 22. Pilot operation of control stick 1 thereafter does not result in any control through valve 4. However, switching elements 16, 17, and 18 are actuated to energize motor 30 so as to enable the pilot to control the airplane by means of trim tab 29 without aid of the power boost 5.

In manual operation, movement of stick 1 moves lever 27 through torque interconnect 40. Valve 31 is opened under these conditions by pressure controlled switch 32, allowing fluid to by-pass piston 22. If control surface 6 is being subjected to high aerodynamic loads, the resistance to movement of this surface in response to control stick movement may result in the pilot being unable to move lever 27 by manual force and torque member 40 will then permit stick 1 to pivot about 2. This results in movement of rod 15 to actuate switch 17 or 18 to energize motor 30 to thereby deflect tab 29 and provide an aerodynamic boost to assist in moving the control surface.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In an aircraft, a control surface, trim means operatively connected to said control surface, a control stick resiliently connected to said control surface to operate the same, a servo control valve operatively connected to said control stick, power boost means controlled by said servo valve connected to said control surface for assisting in operating the same, electrical means connected to said trim means for operating the same including switch means operatively connected to said servo valve to be in an open position when said valve is in a balanced condition and movable to a closed position upon movement of said valve to an unbalanced condition and manual switch means operatively connected with said first-named switch means for controlling the operation of said trim means until said servo valve is balanced and said first-named switch means is open.

2. In an aircraft, a control surface; trim means operatively connected to said control surface; a control stick resiliently connected to said control surface to operate the same; artificial feel means for exerting a force on said stick proportional to the movement thereof; a servo control valve operatively connected to said control stick; power boost means controlled by said servo valve and connected to said control surface for assisting in operating the same; electrical means connected to said trim means for operating the same including a pair of operatively connected switches, one of said switches being operatively connected to said servo valve to be in an open position when said valve is in a balanced condition and movable to a closed position upon movement of said valve to an unbalanced condition, and the other of said switches being manually operable to control the operation of said trim means until said servo valve is balanced and said first-named switch is open; and electrical means connected to and controlled by said manual switch for relieving the artificial feel force applied to said stick.

3. In an aircraft, a control surface; trim means operatively associated with said control surface; a control stick; a servo control valve operatively connected to said control stick; power boost means controlled by said servo valve and operating said control surface; electrical means connected to said trim means for operating the same, including a trio of operatively connected switches, one of said switches being operatively connected to said servo valve to be in an open position when said valve is in a balanced condition and movable to a closed position on movement of said valve to an unbalanced condition, another of said switches being manually operable, and relay means operatively associated with both of said two switches for closing the third of said switches when said first two switches are closed and maintaining it closed until both of said first-named switches are open.

4. A device as recited in claim 3 and further including switch means responsive to pressure failure in said power boost means, means including a bypass valve operated by said pressure-responsive switch means to render said power boost means inoperative and means operatively connecting said trim means to said control stick upon said pressure failure whereby said trim means may be operated to control said aircraft.

5. In an aircraft; a control surface; trim means operatively associated with said control surface; a control stick; artificial feel means for exerting a force on said stick proportional to the movement thereof; a servo control valve operatively connected to said control stick; power boost means controlled by said servo valve for operating said control surface; electrical means connected to said trim means for operating the same including a trio of switches, one of said switches being operatively connected to said servo valve to be in an open position when said valve is in a balanced condition and movable to a closed position on movement of said valve to an unbalanced condition, another of said switches being manually operable, and relay means operatively associated with both of said two switches for closing the third of said switches when said two switches are closed and maintaining it closed until both of said first-named switches are open; and electrical means connected in parallel with said series circuit and controlled by said manual switch for relieving the artificial feel force applied to said stick.

6. In an aircraft, a control surface, trim tab means operatively associated with said control surface, a control stick, artificial feel means connected to said control stick for exerting a force thereon proportional to the movement thereof, means for moving said control surface in response to movement of said stick, means for controlling operation of said trim means including means conditioned by a predetermined movement of said stick, and manual means operatively connected therewith, and means controlled by said manual means for relieving the artificial feel force applied to said stick.

7. In an aircraft, a control surface, trim means operatively associated with said control surface, a control stick, artificial feel means for exerting a force on said stick proportional to the movement thereof, means for moving said control surface in response to movement of said stick, electrical means connected to said trim means for operating the same including a switch operable in response to a predetermined movement of said control stick, a relay switch energized and operated by said first switch and a manually operated switch operatively connected with said two switches, and electrical means connected to and controlled by said manual switch for relieving the artificial feel force applied to said stick.

8. In an aircraft, a control surface, a trim tab pivotally connected to said control surface, a control stick, artificial feel means for exerting a force on said stick proportional to the movement thereof, means for moving said control surface in response to movement of said stick, electrical means connected to said trim tab for operaitng the same including a pair of operatively connected switches, one of said switches being operable in response to a predetermined movement of said control stick and the other of said switches being manually operable, and electrical means controlled by said manual switch for relieving the artificial feel force applied to said stick.

References Cited in the file of this patent

UNITED STATES PATENTS

| | | |
|---|---|---|
| 2,373,575 | Lemonier | Apr. 10, 1945 |
| 2,392,381 | Hanson et al. | Jan. 8, 1946 |
| 2,395,671 | Kleinhans et al. | Feb. 26, 1946 |
| 2,583,828 | Gerstenberger | Jan. 29, 1952 |
| 2,639,108 | Feeney et al. | May 19, 1953 |

FOREIGN PATENTS

| | | |
|---|---|---|
| 572,494 | Great Britain | Oct. 10, 1945 |
| 578,698 | Great Britain | July 9, 1946 |